(12) United States Patent
Seth

(10) Patent No.: US 11,423,945 B1
(45) Date of Patent: Aug. 23, 2022

(54) REAL-TIME VIDEO COLLABORATION

(71) Applicant: Microsoft Technology Licensing, LLC, Redmond, WA (US)

(72) Inventor: Rolly Seth, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/181,293

(22) Filed: Feb. 22, 2021

(51) Int. Cl.
| | |
|---|---|
| *G11B 27/036* | (2006.01) |
| *G11B 27/034* | (2006.01) |
| *G11B 27/34* | (2006.01) |
| *H04L 65/403* | (2022.01) |
| *H04L 65/401* | (2022.01) |

(52) U.S. Cl.
CPC ......... *G11B 27/036* (2013.01); *G11B 27/034* (2013.01); *G11B 27/34* (2013.01); *H04L 65/403* (2013.01); *H04L 65/4015* (2013.01)

(58) Field of Classification Search
CPC ..... G11B 27/036; G11B 27/034; G11B 27/34; H04L 65/4015; H04L 65/403
See application file for complete search history.

(56) References Cited

U.S. PATENT DOCUMENTS

| | | | |
|---|---|---|---|
| 10,757,171 B1 | 8/2020 | Lucco | |
| 2014/0082472 A1 | 3/2014 | Sitrick et al. | |
| 2015/0301720 A1* | 10/2015 | Gottlieb | H04L 65/4038 715/753 |

FOREIGN PATENT DOCUMENTS

WO 2019157280 A2 8/2019

OTHER PUBLICATIONS

Berglund, Kurt, "How a Fluid Framework Service Works", Retrieved From: https://medium.com/swlh/how-a-fluid-framework-service-works-c82fe9f78ae9, Sep. 18, 2020, 5 Pages.
"International Search Report and Written Opinion Issued in PCT Application No. PCT/US22/013572", dated Apr. 29, 2022, 10 Pages.

* cited by examiner

*Primary Examiner* — Thai Q Tran
*Assistant Examiner* — Jose M Mesa
(74) *Attorney, Agent, or Firm* — NovoTechIP International PLLC

(57) ABSTRACT

A method and system for providing real time video collaboration production may include receiving a first video content portion from a first collaborator, the first video content portion being associated with a first sequence indicator, receiving a second video content portion from a second collaborator, the second video content portion being associated with a second sequence indicator, determining an order for the first video content portion and the second video content portion based on the first sequence indicator and the second sequence indicator, automatically integrating the first video content portion with the second video content portion based on the order to create an integrated video content portion, and providing the integrated video content portion for real-time display to the first collaborator and the second collaborator.

20 Claims, 15 Drawing Sheets

REAL-TIME VIDEO COLLABORATION

TECHNICAL FIELD

This disclosure relates generally to collaborative video production, and, more particularly, to a method of and system for real-time collaboration on production of a video.

BACKGROUND

In recent years, there has been a significant increase in the number of people working from home or otherwise collaborating with colleagues or others remotely from different geographical locations. While working remotely offers flexibility and certain time-saving benefits, it is often difficult to simultaneously collaborate with others on the same work project, from different devices (e.g., while being remote). For example, it may be a challenge to collaboratively create, view, or edit a document simultaneously with others that are in different geographical locations. This is particularly the case for certain types of content such as multimedia (e.g., video). This challenge may lead to inefficiency and user frustrations as different users may have to take turn creating and/or editing content which may then need to be reviewed and/or edited by others.

Hence, there is a need for improved systems and methods of collaborative video production.

SUMMARY

In one general aspect, the instant disclosure describes a data processing system having a processor and a memory in communication with the processor wherein the memory stores executable instructions that, when executed by the processor, cause the data processing system to perform multiple functions. The functions may receiving a first video content portion from a first collaborator, the first video content portion being associated with a first sequence indicator, receiving a second video content portion from a second collaborator, the second video content portion being associated with a second sequence indicator, determining an order for the first video content portion and the second video content portion based on the first sequence indicator and the second sequence indicator, automatically integrating the first video content portion with the second video content portion based on the order to create an integrated video content portion, and providing the integrated video content portion for real-time display to the first collaborator and the second collaborator.

In yet another general aspect, the instant disclosure describes a method for providing real time video collaboration production. The method may include receiving a first video content portion from a first collaborator, the first video content portion being associated with a first sequence indicator, receiving a second video content portion from a second collaborator, the second video content portion being associated with a second sequence indicator, determining an order for the first video content portion and the second video content portion based on the first sequence indicator and the second sequence indicator, automatically integrating the first video content portion with the second video content portion based on the order to create an integrated video content portion, and providing the integrated video content portion for real-time display to the first collaborator and the second collaborator.

In a further general aspect, the instant disclosure describes a non-transitory computer readable medium on which are stored instructions that when executed cause a programmable device to receive a first video content portion from a first collaborator, the first video content portion being associated with a first sequence indicator, receive a second video content portion from a second collaborator, the second video content portion being associated with a second sequence indicator, determine an order for the first video content portion and the second video content portion based on the first sequence indicator and the second sequence indicator, automatically integrate the first video content portion with the second video content based on the order to create an integrated video content portion, and provide the integrated video content portion for real-time display to the first collaborator and the second collaborator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
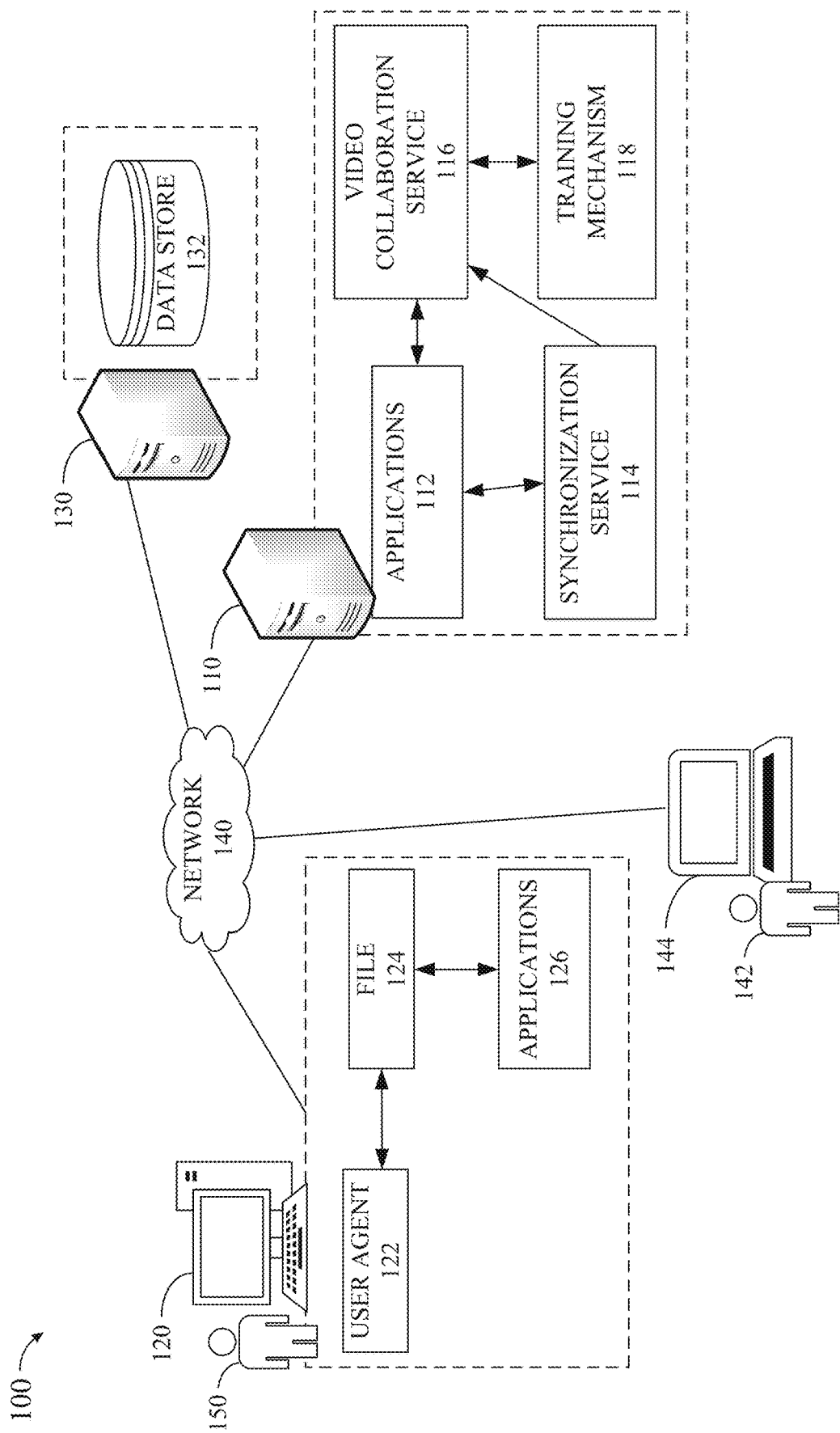
FIG. 1A-1C depict an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As more people begin working remotely and/or collaborating with others from different geographical locations, there is an increased need for mechanisms that enable collaborative creation of various work products. To address this need, recent solutions have been developed that enable collaborations on certain types of documents such as word and spreadsheet documents. For example, some collaboration mechanisms enable users to view and contribute to a document simultaneously with others, thus creating a live collaboration environment. These mechanisms are often able to offer simultaneous collaboration, because they can display the same screen containing content that is being edited and/or created to all collaborators. While this may be useful in providing a collaborative environment for certain types of content, it cannot be applied to video production in which the displayed screen may change quickly. As a result, collaborative production of a video project often requires users to work separately on distinct video files which will then need to be combined into a single video by, for example, using a video editing application and may require expertise in video editing to ensure the distinct video files are combined in a visually pleasing manner. This is not only time consuming, inefficient, and inconvenient; it prevents the users from conducting real time collaboration and/or consultation. However, providing real time collaboration on video production is technically difficult as each user may be viewing and working on different frames (e.g., different display screens). Thus, previous mechanisms that enable a user to view a change made by a different user in real time will not work in video production. As such, there exists a technical problem of providing a mechanism for collaboratively creating a video with others in real time.

To address these technical problems and more, in an example, this description provides a technical solution used for real time collaborative video production for multiple users. To do so, techniques may be used to enable users to begin real time collaborative video production, examine video content created by each user, determine an appropriate sequence for content created by different users, intelligently combine the different video content into a single collaborative video and display the different content portions created by the multiple users on the same screen. The real time collaborative video production may be offered as a service and/or as part of various content creation applications to enable video production collaboration in a variety of applications. The collaborative video production user interface for each user may display the other users as real time collaborators, with each video sequence recorded by a user tagged with a sequence number or other symbol designating sequence. A sequencing service may keep track of the shared state of the various content portions, and distribute and/or synchronize the shared state among all collaborators. Each collaborator may have a minimum sequence number assigned to their state. The sequencing service may automatically update the minimum sequence number for all users when other collaborators add content in real-time. The different content portions may be combined with each other by utilizing one or more machine-learning (ML) models that are trained to intelligently combine different video portions into a seamless video. As a result, the technical solution provides a method for enabling real time collaborative production of videos in an efficient and user-friendly manner.

As will be understood by persons of skill in the art upon reading this disclosure, benefits and advantages provided by such implementations can include, but are not limited to, a technical solution to the technical problems of inability to provide a mechanism for real time collaborative production of videos. Technical solutions and implementations provided herein enable multiple users to collaboratively work on the same video together at the same time, while being able to view content the other users have created in real time. This may eliminate the need for users to separately create video portions that will then need to be reviewed and/or edited by other users and combined to form a single video. The benefits provided by these technology-based solutions yield more user-friendly applications, improved communications and increased system and user efficiency.

FIG. 1A illustrates an example system 100, upon which aspects of this disclosure may be implemented. The system 100 may include a server 110 which may include and/or execute a synchronization service 114 and a video collaboration service 116. The server 110 may operate as a shared resource server located at an enterprise accessible by various computer client devices such as client devices 120 and 144. The server may also operate as a cloud-based server for offering global synchronization and video collaboration services. Although shown as one server, the server 110 may represent multiple servers for performing various different operations. For example, the server 110 may include one or more processing servers for performing the operations of the synchronization service 114 and the video collaboration service 116. In some implementations, the video collaboration service 116 is provided as part of one or more applications by servers housing such applications. It should be noted that each of the synchronization service 114 and video collaboration service 116 may be implemented as software, hardware, or combinations thereof.

The synchronization service 114 may provide global and/or enterprise-based message synchronization services for multiple users. The synchronization service 114 may operate to receive a message (e.g., a video content) from a user participating in a video collaboration operation, determine that the message is for a given collaboration, generate a sequence number or other symbol designation for the received message (e.g., the received video content), and then broadcast a message identifying the video content to each of the collaborators participating in the collaboration. In this manner, the synchronization service may enforce a common order of operations (e.g., video creation) across all operations occurring by the collaborators. In this manner, the synchronization service may ensure that video content portions created by the collaborators have a correct sequence number and as such are properly sequenced when combined together to create the final video. In some implementations, the video collaboration service 116 may operate as disclosed in detail in U.S. Pat. No. 10,757,171, entitled "Merge Tree for Collaboration," which is incorporated herein by reference in its entirety.

The video collaboration service 116 may provide intelligent real time integration of the various video content portions to create a seamless combined video. The video collaboration 116 may be provided as part of an application providing video collaboration features. The video collaboration service 116 may operate to receive multiple video content portions along information about the video content portions and/or users creating each of the content portions, as well as the sequence numbers for each of the video content portions (from the synchronization service). Once the video content portions and additional information are received, the video collaboration service 116 may examine the video content portions, determine an order for the received video content portions and identify how to integrate the video content portions into a single seamless video. Some of the operations of the video collaboration service 116 may be performed by one or more video integration ML models, as further discussed below with regard to FIG. 1B.

As a general matter, the methods and systems described herein may include, or otherwise make use of, a machine-trained model to combine separate video content portions. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity and/or determine associations between various video portions. Such determination may be made following the accumulation, review, and/or analysis of data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate creation of seamless videos and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of these ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As still another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

The server 110 may be connected to or include a storage server 130 containing a data store 132. The data store 132 may function as a repository in which files and/or data sets (e.g., training data sets) may be stored. One or more ML models used by the video collaboration service 116 may be trained by a training mechanism 118. The training mechanism 118 may use training data sets stored in the data store 132 to provide initial and ongoing training for each of the models. Alternatively or additionally, the training mechanism 118 may use training data sets unrelated to the data store. This may include training data such as knowledge from public repositories (e.g., Internet), knowledge from other enterprise sources, or knowledge from other pretrained mechanisms (e.g., pretrained models). In one implementation, the training mechanism 118 may use labeled training data from the data store 132 to train one or more of the ML models via deep neural network(s) or other types of ML algorithms. Alternatively, or additionally, the training mechanism 118 may use unlabeled training data. The initial training may be performed in an offline stage or may be performed online. Additionally, and/or alternatively, the one or more ML models may be trained using batch learning.

The server 110 may also include or be connected to one or more online applications 112 that allow a user to interactively view, generate and/or edit digital content. Examples of suitable applications include, but are not limited to, a presentation application, a video creation application, a word processing application, a note taking application, a text editing application, an email application, an instant messaging application, a communications application, a web-browsing application, and a collaboration application.

The client devices 120 and 144 may be connected to the server 110 via a network 140 to enable users 150 and 142 to collaboratively work on creating a video. The network 140 may be a wired or wireless network(s) or a combination of wired and wireless networks that connect one or more elements of the system 100. Each of the client devices 120 and 144 may be a personal or handheld computing device having or being connected to input/output elements that enable a user 150 and 142, respectively, to interact with digital content such as content of an electronic file 124 on the client device 120. Examples of suitable client devices 120 and 144 include but are not limited to personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 5 and 6.

The client device 120 may include one or more applications 126. Each application 126 may be a computer program executed on the client device that configures the device to be responsive to user input to allow a user to interactively view, generate and/or edit digital content such as content within the file 124. The file 124 may include any type of data, such as text (e.g., alphabets, numbers, symbols), emoticons, still images, video and audio. The file 124 and the term file and/or document used herein can be representative of any file that can be created via an application executing on a computer device which may include video content. Examples of documents include but are not limited to presentation word-processing documents, presentations, spreadsheets, notebooks, email messages, websites (e.g., SharePoint sites), media files and the like. The file 124 may be stored locally on the client device 120, stored in the data store 132 or stored in a different data store and/or server.

The application 126 may process the file 124, in response to user input through an input device, to create and/or modify the content of the file 124, for example, by creating a video. Examples of suitable applications include, but are not limited to a presentation application, a video creation application, a word processing application, a note taking application, a text editing application, an email application, an instant messaging application, a communications application, a web-browsing application, and a collaboration application.

The client device 120 may also access applications 112 that are run on the server 110 and provided via an online service as described above. In one implementation, applications 112 may communicate via the network 140 with a user agent 122, such as a browser, executing on the client device 120. The user agent 122 may provide a user interface (UI) that allows the user to interact with application content and files stored in the data store 132. The UI may be displayed on a display device of the client device 120 by utilizing for example the user agent 122. In some examples, the user agent 122 may be a dedicated client application that provides a UI and access to files stored in the data store 132. In other examples, applications used to create, modify and/or view digital content such as content of files maybe local applications such as the applications 126 that are stored and executed on the client device 120, and provide a UI that allows the user to interact with application content and content of the file 124.

It should be noted that although only two client devices are shown in FIG. 1A, the actual number of client devices used to collaborate on a video may vary and can exceed two client devices. For example, four or more users may operate as collaborators by using different client devices that communicate via the network 140. Furthermore, each of the client devices (including client device 144) may include elements such as user agent 122, file 124 and applications 126.

Figure 1B:
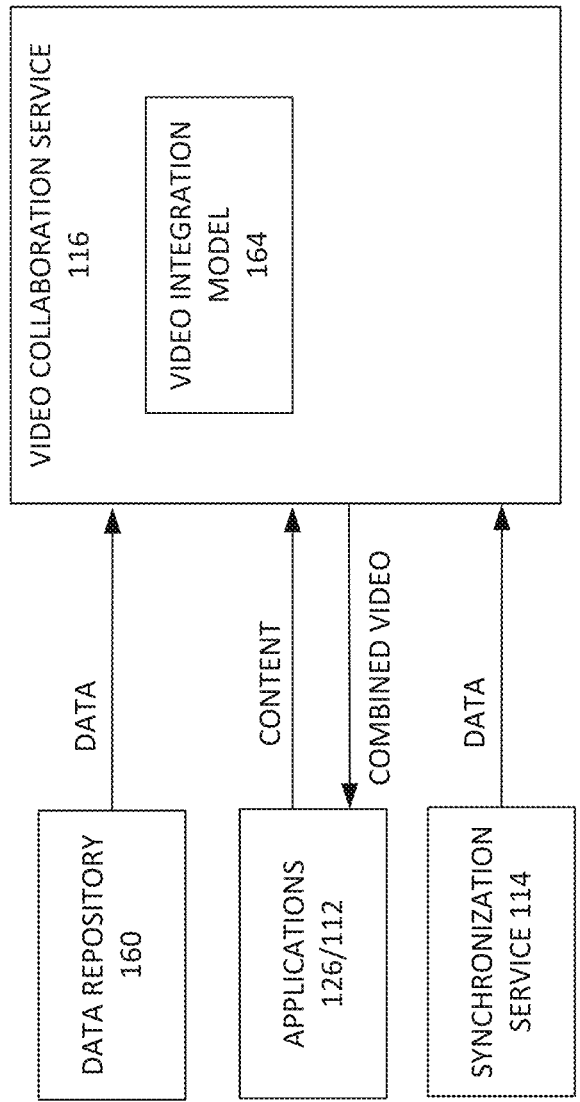

FIG. 1B depicts a system level data flow between some of the elements of system 100. As discussed above, video content portions being created by multiple collaborators via one or more applications 126 and/or online applications 112 may be transmitted to the video collaboration service 116 for integration into a single video. The content may be transmitted upon determining that a video content portion is complete. For example, when the user utilizes an input device (e.g., a mouse) coupled to the client device 120 to invoke a UI option for pausing or stopping recording of a video, the latest recorded video portion (e.g., the video portion that has not yet been transmitted), may be transmitted for integration into a collaborative video.

Each time, a video content portion is transmitted, in addition to the video content portions, a sequence number or symbol assigned to the video content portion by the synchronization service may also be transmitted to enable the video collaboration service to determine the correct ordering of the video content portions. Furthermore, additional information that may be useful for integrating the video content portions into a single video may be transmitted. This may include information about the application used for content creation, contextual information about the document from which the content originates (e.g., a presentation document), information about the collaborator creating the content and/ or other relevant information. For example, information about the type of document (e.g., word document, email, presentation document, etc.), the topic of the document, the position of the user within an organization (e.g., the user's job title or department to which the user belongs, if known), and the like may be transmitted. In some implementations, some of the information transmitted may be sent from a data repository 160. The data repository may contain user-specific data about each collaborator. For example, it may contain user profile data (e.g., the user's job title, various profiles within which the user creates content such as work profile, blogger profile, social media profile and the like) and/or user history data. The data contained in the data repository 160 may be provided as an input directly from the data repository 160 or it may be retrieved by applications 126 and/or online applications 112 and transmitted from them. Alternatively, the data may be retrieved, as needed, by the video collaboration service 116.

The data transmitted may be used by a video integration model 164 to stitch each new video content to a previous video content portion, as the portions are received. The ordering may be determined based on the sequence number of each content portion. The video integration model 164 may be an ML trained for stitching separate video content portions together in a manner that provides a seamless video. For example, the ML model may need to determine if the lighting of two consecutive content portions is different, and if so, how to modify the lighting in each portion to provide a seamless transition. In another example, the ML model may determine if transitions are needed between two different portions, and if so, the type of transition that may provide a smooth shift to the new video portion. These may include overlaying or underlaying a segment of one video content portion (e.g., one or more video frames) over another one. In another example, the ML model may include audio editing elements that ensure the audio portion of the video is not disjointed. This may include removing background noise from one or more of the video portions, performing audio level matching (e.g., ensuring the volume is consistent across integrated video portions), inserting appropriate transition audio, and the like. Thus, the video integration model 164 may receive as an input the video content portions along with additional data relating to the video content portions, collaborators, document and the like, and provide, as an output, an integrated video that stitches the received video content portions. This process may be performed automatically and in real time, such that each time a new video content portion is received in an active collaboration session, the new video content portion is added to the previously combined video portion to provide the latest combined video. The output may be provided back to the applications 126/112 for display to the user. In some implementations, in addition to the combined video, the individual video content portions are also transmitted back to the applications 126/112 for display to the collaborators, such that each collaborator can view the video portion generated by other collaborators.

Figure 1C:
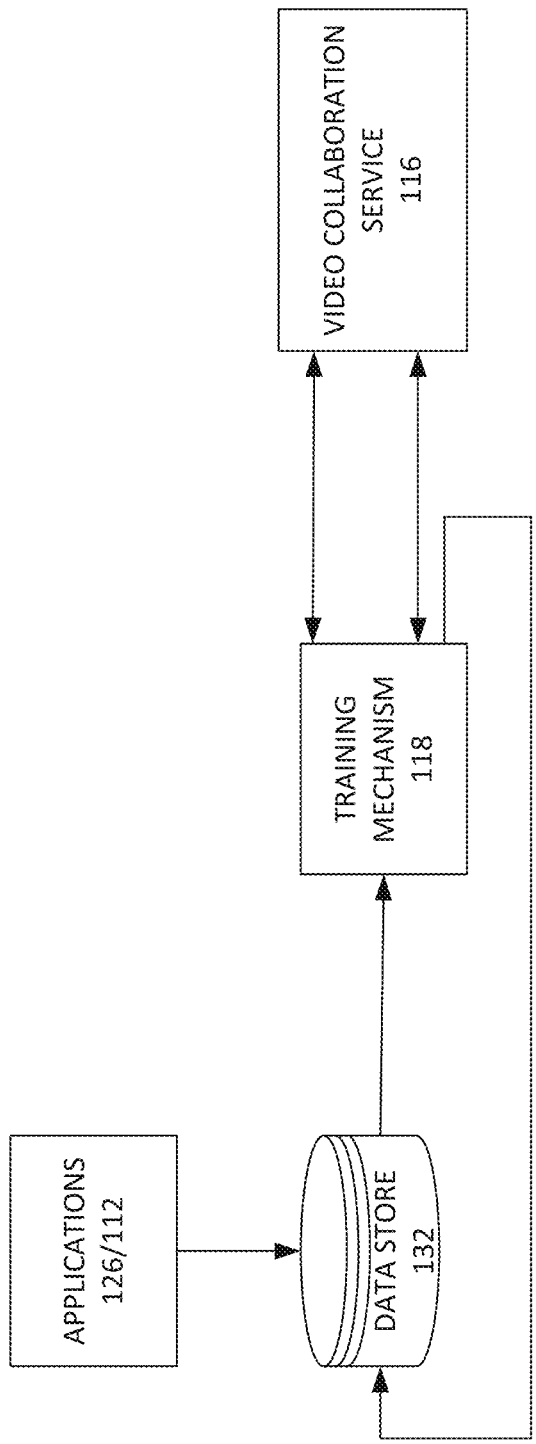

FIG. 1C depicts how one or more ML models used by the video collaboration service 116 may be trained by using the training mechanism 118. The training mechanism 118 may use training data sets stored in the data store 132 to provide initial and ongoing training for the model(s). For example, the video integration model 164 may be trained by the training mechanism 118 using a data sets from the data store 132. The training data sets may include labeled and unlabeled data, and may contain video content portions that are combined to form single videos. The labeled data sets may be used in a supervised learning process to train the video integration model 164.

To provide ongoing training, the training mechanism 118 may also use training data sets received from the trained ML model. Furthermore, data may be provided from the training mechanism 118 to the data store 132 to update one or more of the training data sets in order to provide updated and ongoing training. Additionally, the training mechanism 118 may receive training data such as knowledge from public repositories (e.g., Internet), knowledge from other enterprise sources, or knowledge from other pre-trained mechanisms.

Figure 2A:
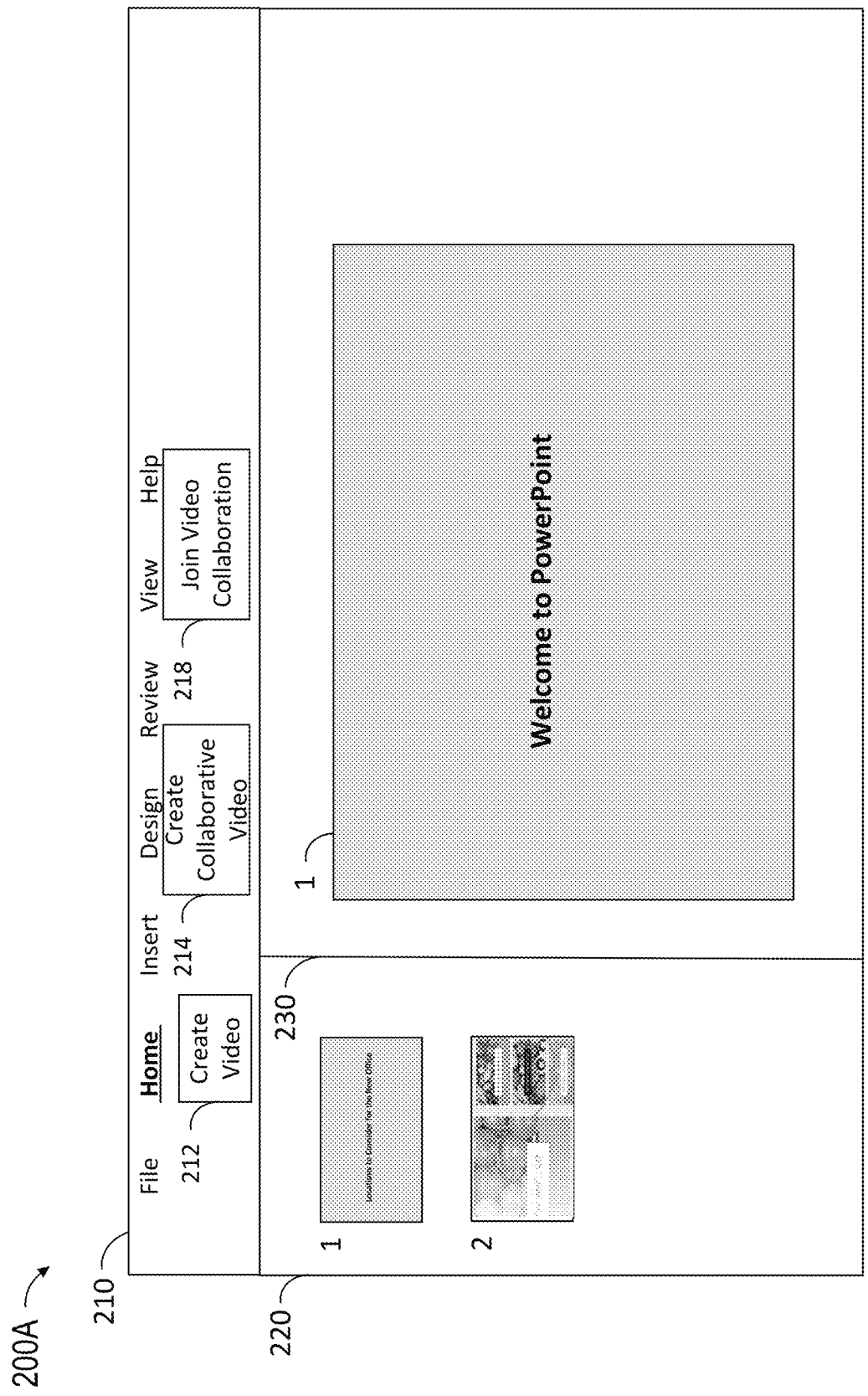
FIG. 2A-2G are example graphical user interface (GUI) screens for providing real-time collaborative video production.
Figure 2B:
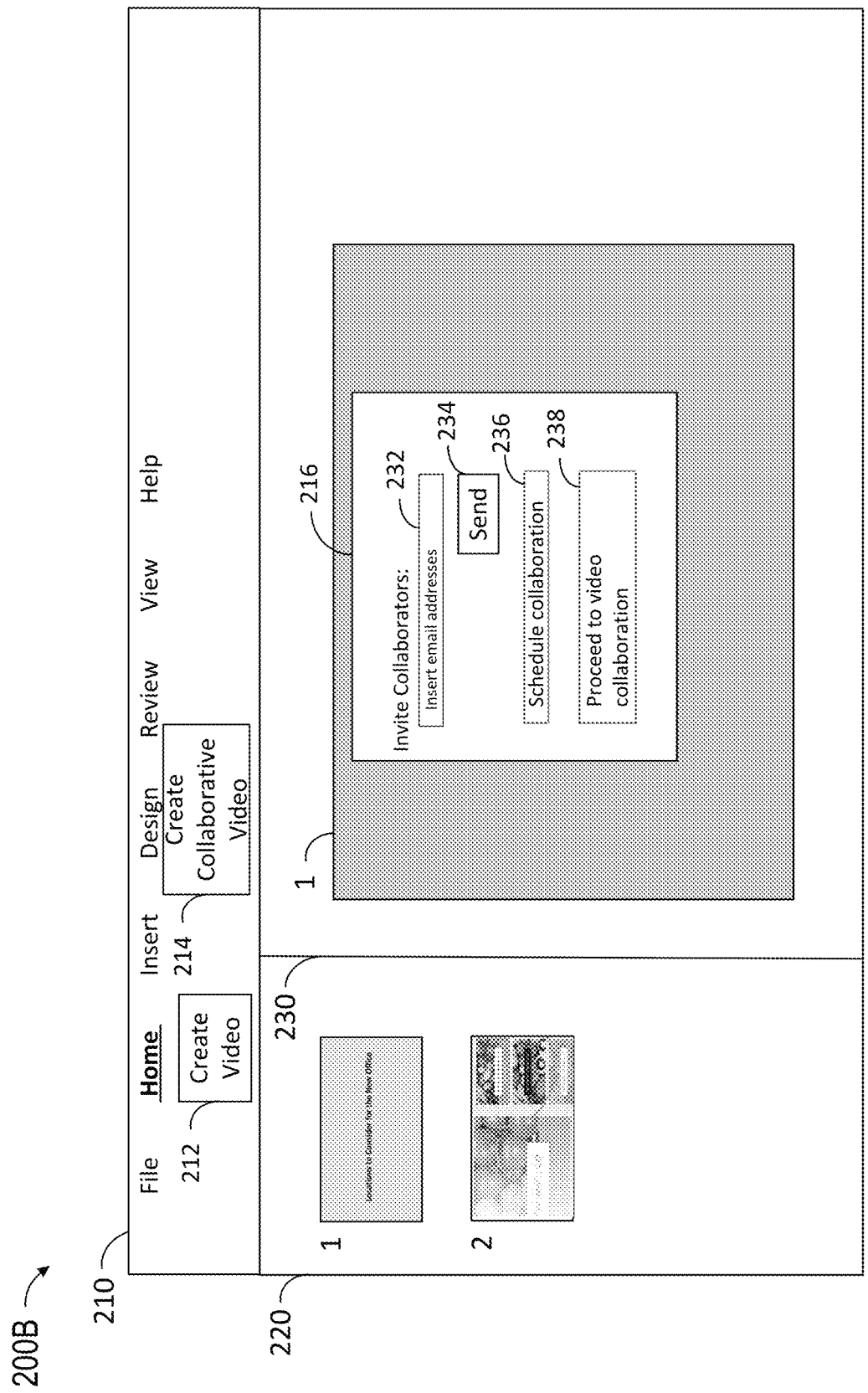

FIG. 2A-2G are example GUI screens for providing real-time collaborative video production. FIG. 2A is an example GUI screen 200A of a presentation application (e.g., Microsoft PowerPoint®) displaying an example document. GUI screen 200A may include a toolbar menu 210 containing various tabs each of which may provide multiple UI elements for performing various tasks. For example, the toolbar menu 210 may provide options for the user to perform one or more tasks to create or edit the document. Screen 200A may also thumbnail pane 220 for displaying a thumbnail for each of the slides in the document (e.g., slides 1 and 2) and a content pane 230 for displaying the content of the document (e.g., displaying the slides one slide at a time). In one implementation, each of the thumbnail pane 220 and the content pane 230 may include a scroll bar for moving between the various slides in the document. The content may be displayed to the user for viewing and/or editing purposes and may be created by the user. For example, the user may utilize an input device (e.g., a keyboard) to insert input such as text, one or more images, icon(s), emoticons, and the like into the content (e.g., on a slide displayed in the content pane 230).

The Screen 200A may include a UI element 212 (e.g., menu button) for creating a video within the document. In some implementations, the video includes some of the content of the document (e.g., the slides in the presentation document) along with an audio and/or video portion captured by the client device displaying the GUI screen 200A (e.g., by a camera provided as part of or connected to the client device). The UI element may be any menu option that can be used to indicate a request by the user to begin creating a video. In one implementation, instead of or in addition to being located on the toolbar menu 210, the UI element 212 is provided via a context menu. Many other methods of displaying a UI element for invoking creation of videos are possible. For example, the UI element 212 may be displayed on a backstage screen which may be accessed upon selecting the File option in the toolbar menu 210. In some implementations, the backstage screen may provide an export option, upon selection of which a UI element for creating a video may be displayed.

The screen 200A may also include a UI element 214 for initiating creation of a collaborative video and a UI element 218 for joining a video collaboration that has already started. In some implementations, selection of UI element 214 may result in the display of a UI menu 216 (e.g., a pop-up menu) illustrated in screen 200B of FIG. 2B which provides various options for starting the video collaboration process. The UI menu 216 may include an option for inviting collaborators by entering their email addresses and/or other identifying information (e.g., tagging) into a UI element 232 and selecting a send UI element 234 for transmitting an invitation to potential video collaborators. This may cause a notification email and/or other type of notification message to be sent to the collaborators identified in the UI element 232. In some implementations, the notification email or message may include a link to the document for which video collaboration is to be performed (e.g., the current document). Clicking on the link may open the document on each collaborator's device. In some implementations, once the document is opened, a video recording screen such as the one discussed with respect to FIG. 2C is automatically displayed to enable quick access to video collaboration capabilities.

The UI menu 216 may also include a UI element 236 for scheduling a video collaboration in the future. Selecting the UI element 236 may result in a calendar (e.g., Outlook calendar) being displayed from which the user may schedule a collaboration meeting or appointment. The UI menu 216 may further include a UI element 238 to enable the user to proceed directly to video collaboration.

Figure 2C:
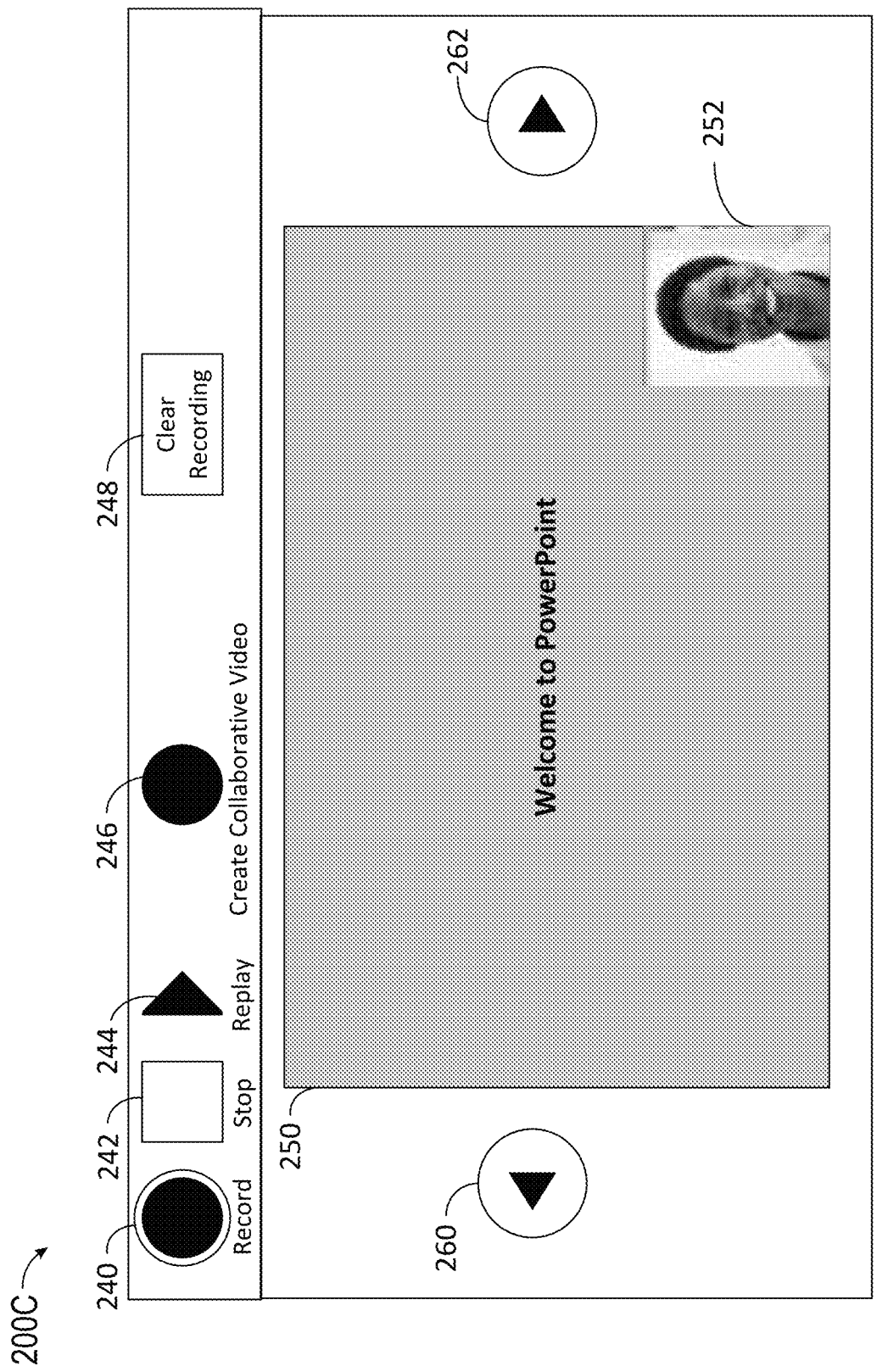
Figure 2D:
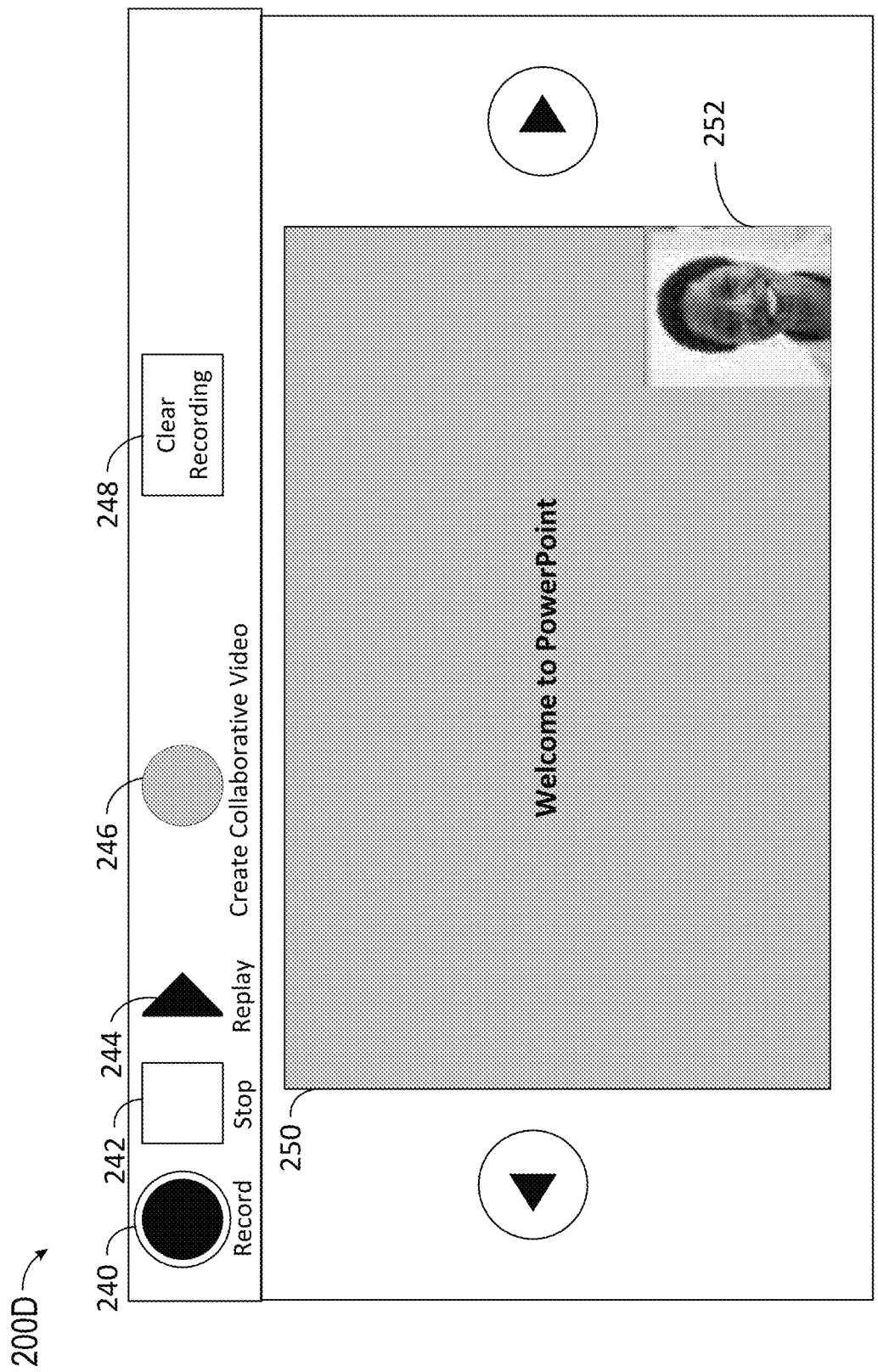
Figure 2E:
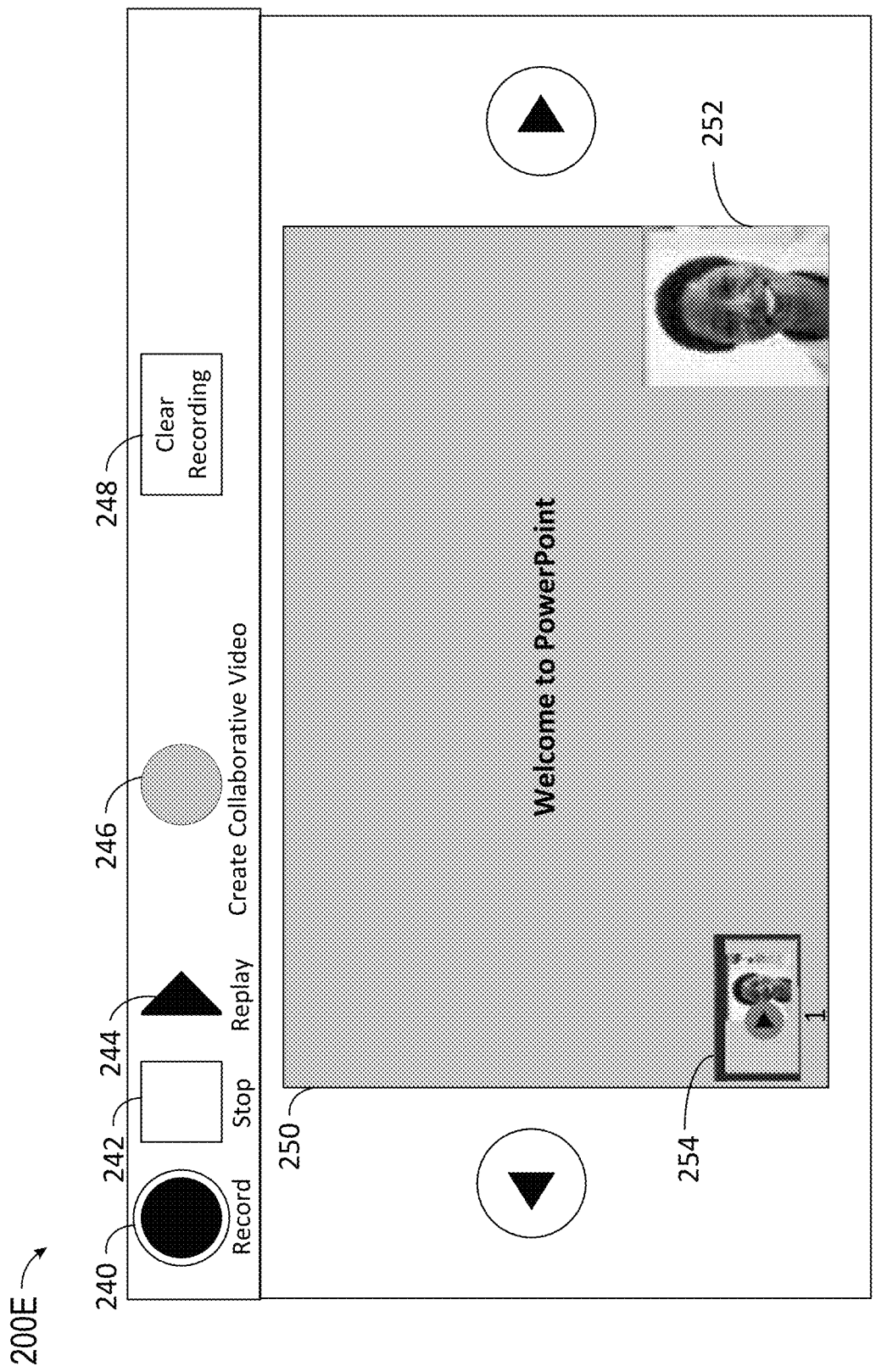

Once UI element 212 or the UI element 238 of the menu 216 is selected, a video recording screen, such as the screen 200C of FIG. 2C, may be displayed to enable the user to begin creating a video. The screen 200C may include a view pane 250 that displays the image that the video will capture once recording begins. In some implementations, when screen 200C is first displayed, the view pane 250 may show the beginning of the content in the document (e.g., slide 1 of the slide deck). Furthermore, the view pane 250 may display a thumbnail 252 of a real time (e.g., live) image being received by an image/video capturing device connected to or included in the client device displaying the screen 200C (e.g., a camera included in the computing device). When the image/video capturing device receives an image of a person (e.g., when the camera captures an image of the user utilizing the client device), the thumbnail 252 will display a real time image of the user. This image may be recorded as part of the video recording process. For example, the thumbnail may be displayed on a portion of the recorded view to display the person giving a presentation about the content of the view pane 250. In some implementations, additional UI elements may be displayed to enable the user to point to specific portions of the view pane 250 while recording the view. For example, a UI element for invoking an onscreen pen may be provided to enable the user to write on the view pane. Furthermore, UI elements may be provided for disabling the real time thumbnail image by for example turning off the camera, when the user does not wish to record themselves as part of the video. Another UI element may be provided for turning on and/off the microphone.

The screen 200C may also include UI elements 260 and 262 for moving between the content of the document. For example, UI element 260 may be used to cause the view pane 250 to display the previous slide in the document, while the UI element 262 may be used to cause the view pane 250 to display the next slide in the document. The UI elements 260 and 262 may be used both before video recording begins and during the recording of the video (e.g., when the user desires to move to the next slide during the video presentation).

Once the user is ready to begin recording, they may utilize a UI element 240 for initiating the recording of the video. After recording has started, a UI element 242 may be utilized to stop the recording. Once recording has been stopped or paused, a UI element 244 may be utilized to replay the recorded view. Furthermore, a UI element 248 may be used to clear (e.g., delete) the recording. In some implementations, once selected, the clear recording UI element 248 may provide an option for clearing the recording on a specific portion (e.g., each slide) or clearing the entire recording. In some implementations, each of the UI elements 242, 244 and 248 may be activated/deactivated depending on the status of the video recording process. For example, the UI element 242 may only be activated during the recording of a video. The replay UI element 244 and clear UI element 248, however, may be activated after the recording has been paused or stopped. The UI element 240 may change into a pause button once recording has begun. For example, once the user selects the UI element 240 to begin recording, the shape of the UI element 240 and the text underneath the UI element 240 may be changed to indicate the UI element may now be used to pause the recording.

The screen 200C may also include a UI element 246 for initiating a collaborative video creation operation. In some implementations, once the UI element 246 is invoked, a UI menu such as the menu 216 of FIG. 2B may be displayed to enable the user to invite collaborators, schedule a collaboration or proceed to video collaboration. Once the user chooses to proceed to video collaboration or in implementations where selecting the UI element 246 directly leads to initiating video collaboration, a video collaboration screen such as the screen 200D of FIG. 2D may be displayed.

When the video collaboration screen is first displayed, it may simply display the view pane 250 and the thumbnail image 252 as discussed above with respect to FIG. 2C. However, since video collaboration has already started, the UI element 246 for beginning video collaboration may now be deactivated. At this stage, the user may begin recording a video by selecting the UI element 240 to start video collaboration. Once a recording of a first video portion has been completed, (e.g., the user has selected to pause or stop after recording a portion), a thumbnail 254 for the recorded portion may be added to the view pane 250 as illustrated in the screen 200E of FIG. 2E. The thumbnail 254 may be added in the bottom of the view pane 250 to enable easy access. In alternative implementations, the thumbnail 254 may be displayed in another section of the screen 200E.

When a first collaborator has already begun the process of video collaboration (e.g., collaborator has selected the UI element 246), additional collaborators may join the process by selecting a UI element such as UI element 218 of FIG. 2A for joining in the video collaboration. In some implementations, the video recording screen may include a UI element such as the UI element 256 in screen 200F of FIG. 2F for joining the video collaboration. The UI element 256 may be activated and/or displayed once a first collaborator has started the process of video collaboration. In some implementations, the UI element 256 may be included within the content (e.g., on or adjacent to one or more slides in the slide deck) of the document, once a collaboration session for the document has started (e.g., once an active collaboration session for the document is underway). Upon selection of the UI element 256 (or UI element 218 of FIG. 2A), a video recording screen such as the screen 200D of FIG. 2D may be displayed for the new collaborator to enable them to begin recording a video portion. Furthermore, the UI element 256 may be deactivated for the collaborator who has already joined the video collaboration. In some implementations, once two or more collaborators begin participating in the collaboration process, a UI element (not shown) may display the number and/or name of each collaborator.

Figure 2F:
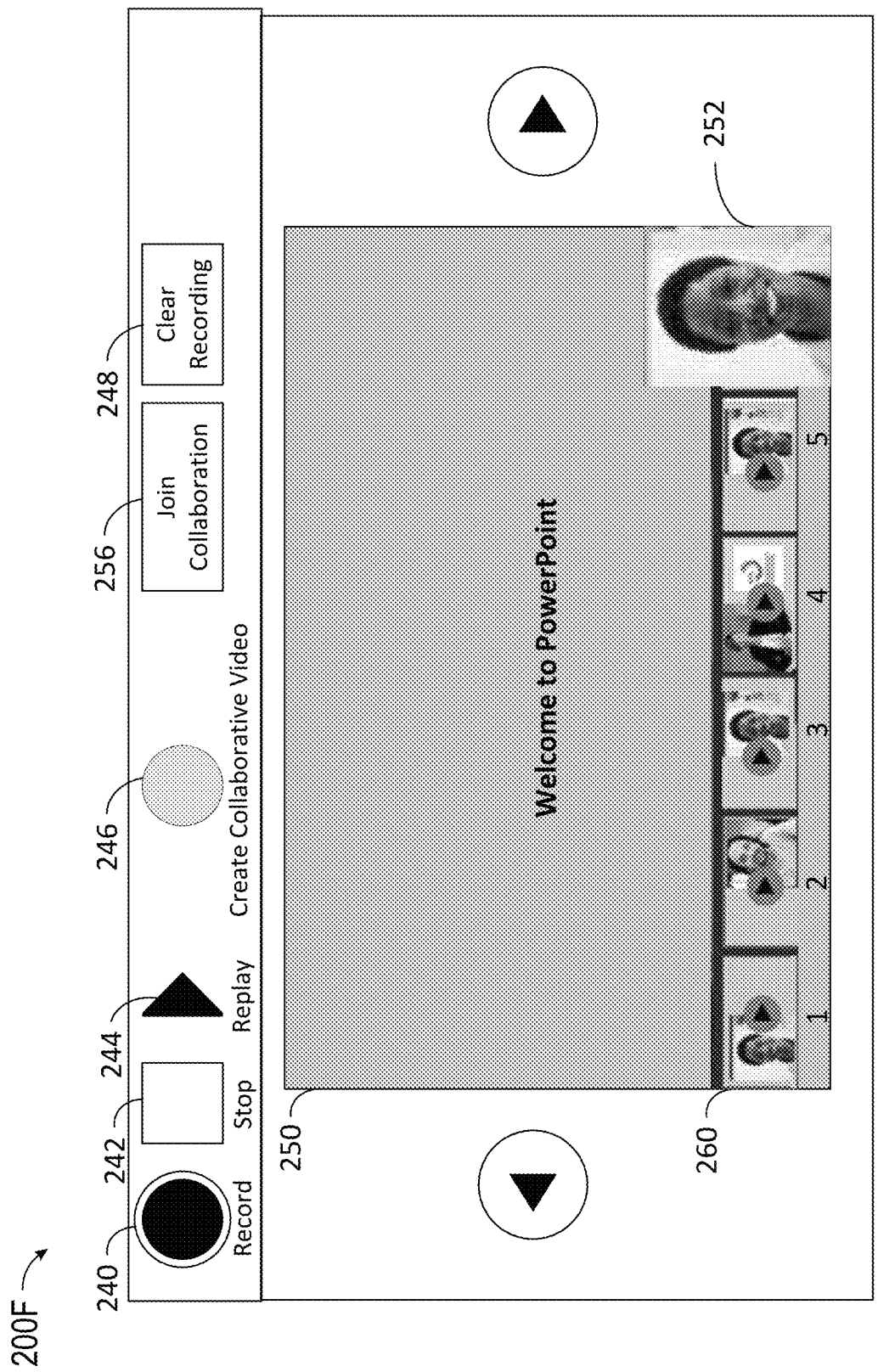
Figure 2G:
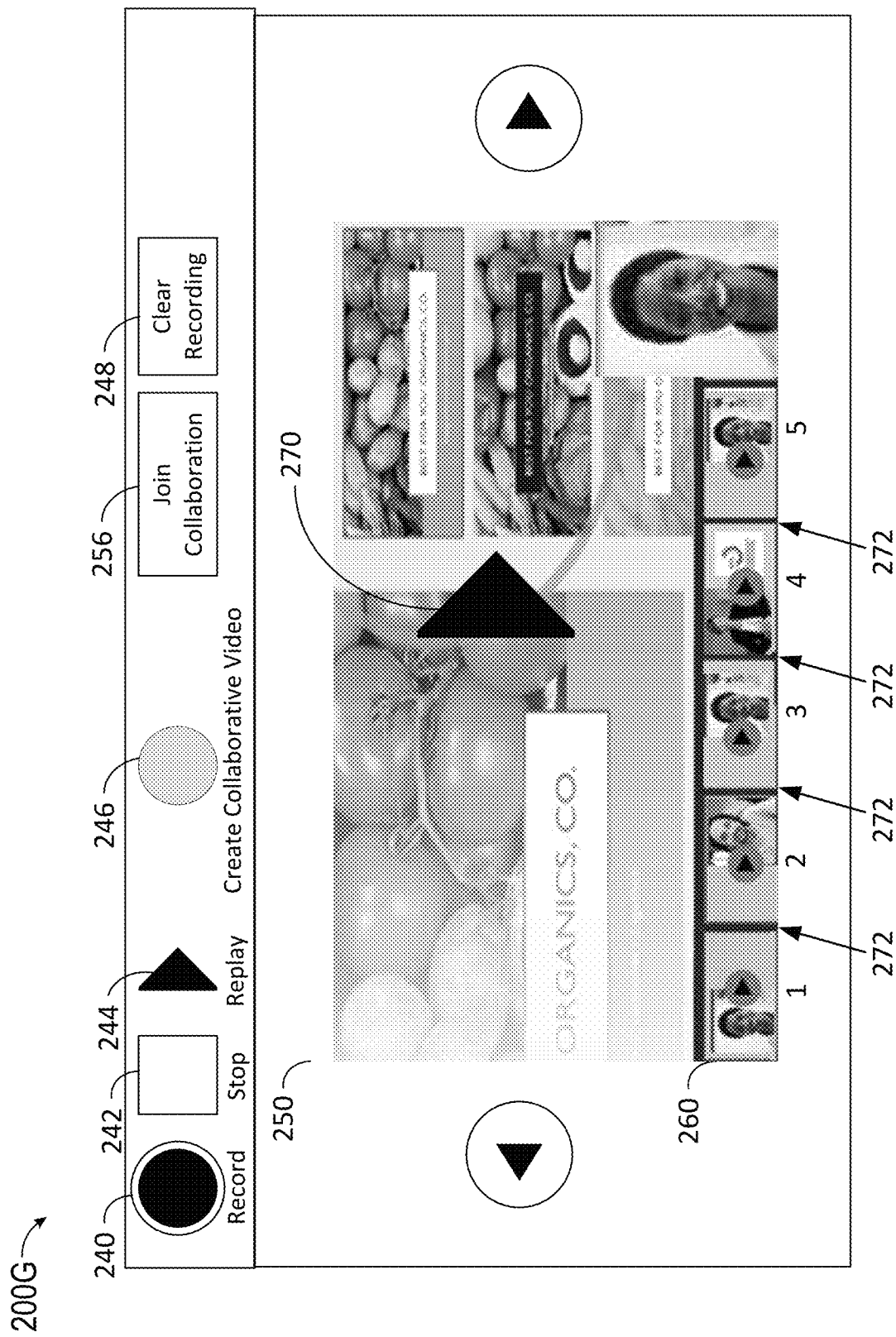

As various collaborators finish recording video portions (e.g., click on pause or stop after recording a video portion), those video portions may be added to a preview pane 260, as shown in FIG. 2F. The preview pane 260 may include playable thumbnails for each of the recorded view portions. As such, any collaborator may press on the play menu option displayed on one of the thumbnails to enable a replay of the selected thumbnail. In some implementations, the replay is displayed within the thumbnail. Alternatively or additionally, the replay may be displayed within the main portion of the view pane 250 (e.g., may be overlayed on the content portion of view pane 250). The thumbnails included in the preview pane 260 may be displayed in the order determined by the synchronization service discussed above. In some implementations, this results in the thumbnails being ordered chronologically in accordance with when recording for each portion was stopped or when recording for each portion started. The preview pane 260 may include numbers below each thumbnail to easily identify the order of the thumbnails. In cases where the number of thumbnails exceed a threshold number, a UI option for scrolling through the thumbnails may be provided.

In addition to providing information about the video portions that have been recorded, the preview pane 260 may also enable collaborators to edit the integrated video by moving the thumbnails around. For example, each thumbnail in the preview pane 260 may be dragged and dropped to a different place on the preview pane 260 to change the order. Furthermore, a video portion may be deleted by selecting a thumbnail and selecting a delete button (e.g., on a keyboard or a context menu). In some implementations, moving or deleting video portions may be performed by any collaborator. In alternative implementations, these operations may only be performed by one or more of the collaborators that have administrative capabilities (e.g., the user who first started the video collaboration or who invited others to collaborate). As video portions are added or edited (e.g., moved around or deleted), the changes are integrated into the integrated video such that, at each point, the integrated video has the latest changes. This means that the integrated video is a live video document that automatically integrates all recent changes as soon as they are completed. In this manner, once a collaborator selects pause or stop, their recorded video portion gets added to the previous recorded portions based on the sequence number of the video recording. Furthermore, as soon as an edit is made to the thumbnails in the preview pane or a video portion is cleared by a collaborator, those changes are also referred in the integrated video. This may occur as other collaborators are actively recording video portions. Thus, at a given time, one or more collaborators may be recording videos, while other recorded videos are transmitted and integrated into the latest version of the integrated video.

At each point during the process, a collaborator may choose to replay the integrated video, by for example, selecting the replay UI element 244. At that stage, the latest version of the integrated video may be displayed in the content portion of the video pane 250, as depicted in screen 200G of FIG. 2G. In some implementations, the integrated video may be paused, rewind or forwarded by using UI elements that may be displayed once the user hovers over or clicks on one or more portions of the video. For example, the integrated video may be played by selecting the UI element 270. The integrated video may display a video that includes all of the recorded portions received from the various collaborators. The separate recorded portions may be stitched together in a manner that does not include disjointed pauses or sudden changes in between videos. As such, the integrated video results in a smooth video that does not include the separations shown in by arrows 272.

It should be noted that while specific UI elements are shown and discussed with respect to the functionalities of FIGS. 2A-2G many other UI configurations for enabling the user to participate in video collaboration activities are contemplated. For example, the UI elements shown in each of the FIGS. 2A-2G may be displayed in different portions of the display screen or other types of UI elements may be used to perform those functions.

Figure 3A:
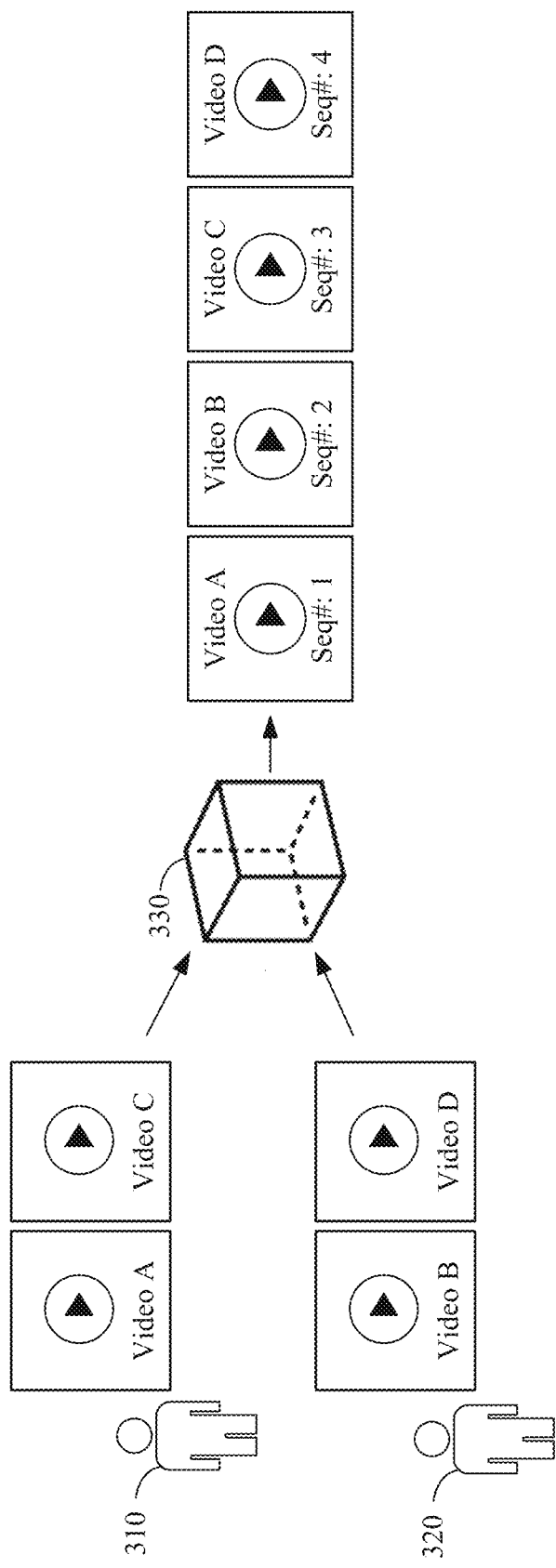
FIGS. 3A-3B are diagrams for sequencing of video content portions.
Figure 3B:
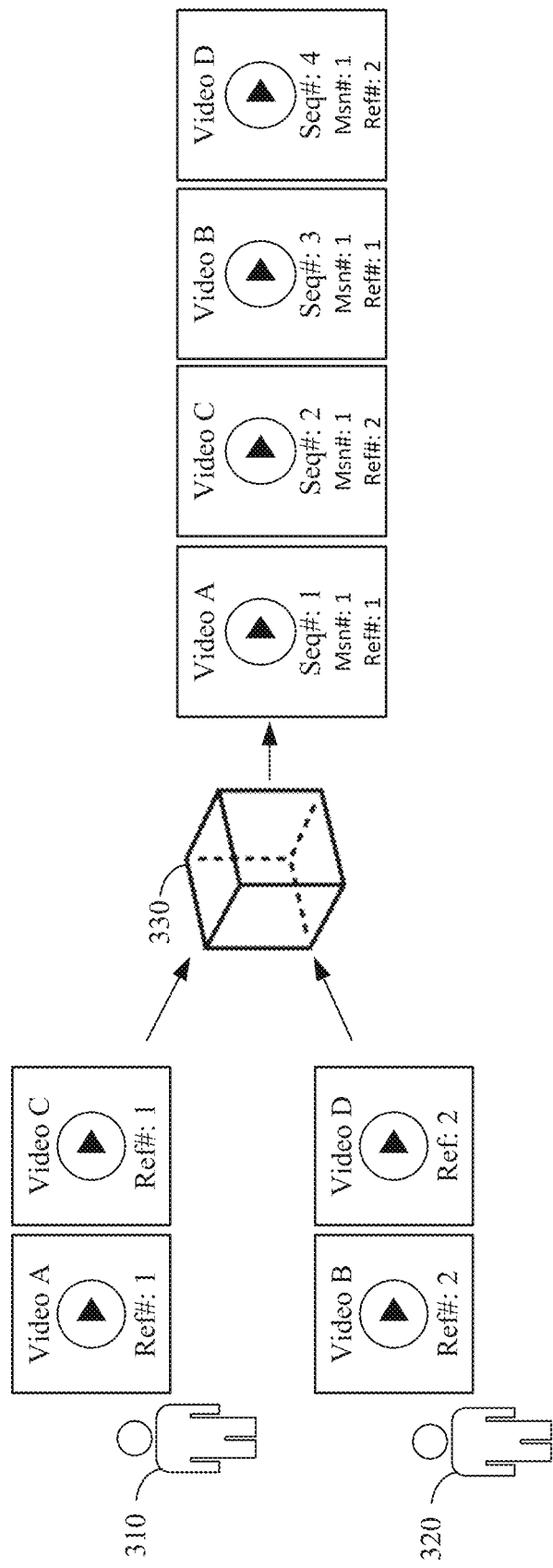

FIGS. 3A-3B are example diagrams for sequence numbering of video content portions. FIG. 3A depicts video content portions A and C created and by user 310 and transmitted from user 310's device, as well as video content portions B and D created by a user 320 and transmitted from the user 320's device. Once each of these video content portions are created, they may be transmitted to the synchronization service 330 so they can receive a sequence number. The synchronization service 330 may operate as discussed above with respect to the synchronization service 114 of FIGS. 1A-1B. To do so, each of the video content portions may be treated as a message. The synchronization service 330 may create an ordered log of these messages. As part of creating the log, synchronization service 330 may stamp each message with a sequence number. The sequence number may reflect the order in which each message is received. This process may involve interleaving messages from different users. However, even when messages are interleaved, the relative ordering of messages from an individual user may be preserved (e.g., video C will have a larger sequence number than A). Thus, video A may have sequence number of 1, while video C has a sequence number of 3. Similarly, video B may be given a sequence number of 2, while video B is given a sequence number of 4.

When a user creates and transmits a new video portion, the synchronization service 330 may have processed the ordered log up to some sequence number. This sequence number may be referred to as the reference sequence number. The reference sequence number may indicate the state of the collaboration when the new video portion was created. Each of the collaborator clients may be notified of the reference sequence number so that they may include it when they send a new video portion to the service. Each sequenced operation may have a total ordering which can be used to break ties. Since each sequenced operation includes its reference sequence number, the local state of each client may be recreated, and the information may be used to correctly update data structures associated with the messages.

As the reference sequence number is transmitted to the multiple collaborators, each collaborator may need to handle changes in reference sequence number. This can become very complex as data structures may need to store a lot of context information to correctly process the operation. To address this issue, the synchronization service 330 may utilize a minimum sequence number. The minimum sequence number may be defined as the minimum reference sequence number of all clients connected to the synchronization service 330. As such, the minimum reference sequence number may monotonically increase and the synchronization service 330 may require that any inbound message (e.g., new video portion) have a reference sequence number that is equal to or greater than the minimum sequence number.

FIG. 3B illustrates the use of the reference sequence number and minimum sequence number. As depicted, each of the video portions may be assigned and transmitted along with a reference sequence number. For example, video A and video C may be transmitted with the reference sequence number 1, while video B and video D are transmitted with the reference sequence number 2. The synchronization service 330 may then examine the transmitted reference sequence numbers to ensure they are equal to or greater than the minimum sequence number. In this manner, the different video portions received from various collaborators may be sequenced correctly such that they are correctly ordered both in the preview pane and when stitched together to generate the integrated video.

Figure 4:
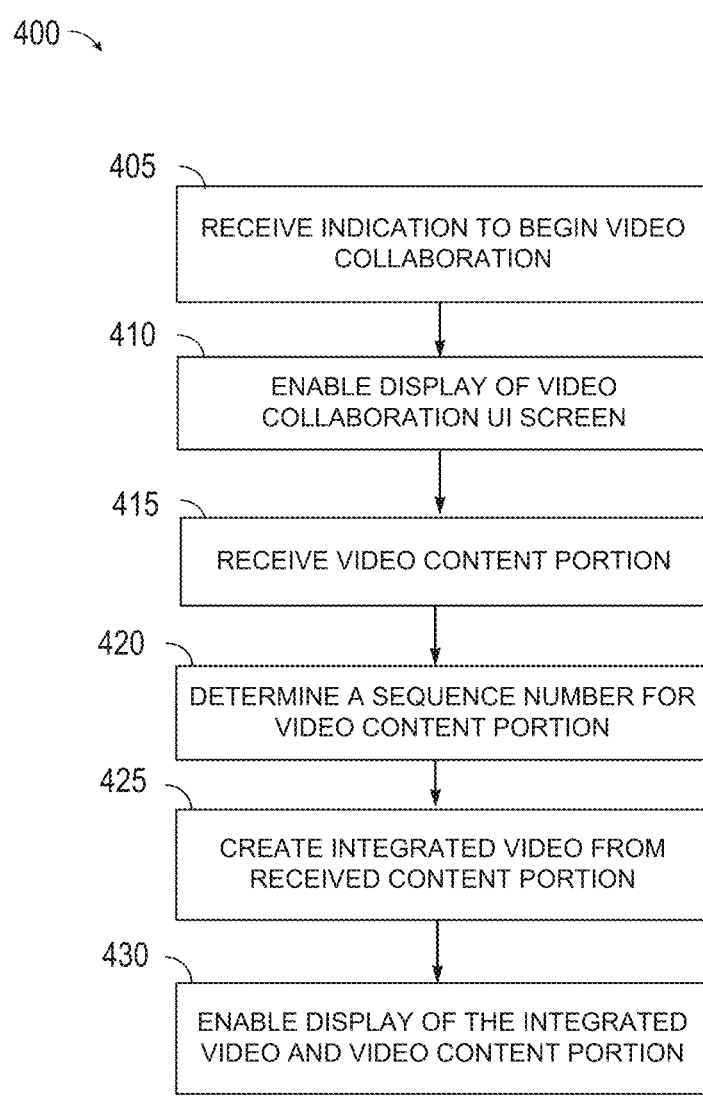
FIG. 4 is a flow diagram depicting an example method for providing intelligent real time collaboration on production of a video.

FIG. 4 is a flow diagram depicting an exemplary method 400 for providing real time collaborative video production. In an example, one or more steps of method 400 may be performed by a video collaboration service (e.g., video collaboration service 116 of FIG. 1), a synchronization service (e.g., synchronization service 114 of FIG. 1 and/or synchronization service 330 of FIG. 3A-3B), and/or an application which includes a real time video collaboration feature (e.g., applications 112 or 126 of FIG. 1A).

At 405, method 400 may begin by receiving an indication to begin real time video collaboration. This may occur, for example, when the user utilizes an input/output device (e.g. a pointing device such as a mouse) coupled to a computer client device to a select a UI element in an application which includes real time collaborative video features. Selecting the UI element may indicate a request for initiating a video collaboration production operation. The request may be received by the application and transmitted to a video collaboration service to provide an indication to begin video collaboration. In some implementations, once the indication to begin a new video collaboration has been received, the video collaboration service initiates a new video collaboration session.

Once the indication to begin video collaboration has been received, method 400 may proceed to enable display of a video collaboration UI screen, at 410. This may involve sending a confirmation message to each active collaborator's client device, which may in turn inform the application that a video collaboration session can be started. Upon receipt of this information, the application may display a version of the video collaboration UI screen on each active collaborator's device. The versions displayed on different collaborator's screen may differ in that each collaborator will have their own view pane which may display the slide they desire to begin recording from as well as their down real time image thumbnail.

After the video collaboration UI screen is displayed for active collaborators, method 400 may proceed to wait until a recorded video content portion is received, at 415. The video content portion may be a video portion recorded by one of the collaborators. Thus, as soon as the collaborator indicates that recording a video portion is finished (e.g., by selecting a pause or stop menu option), the recorded video content portion may be received from the recording device (e.g., a camera). The recorded video portion may then be transmitted to the synchronization service, which may determine a sequence number for the video content portion, at 420. In some implementations, the synchronization service may then transmit the video content portion along with its sequence number to all active collaborators. Additionally, the synchronization service may provide the video content portion along with its sequence number to the video collaboration service.

The video collaboration service may create a real time integrated video from the received video content portion, at 425. This may be done by first determining if there are any other previous video portions in the current collaboration session. If there are other content portions, the ordering of the content portions may be determined based on the sequence number. Furthermore, it may be determined if a previous integrated video exists (e.g., previously received and integrated video portions). The video content portions that have not yet been incorporated into the integrated video may then be stitched together in accordance with their sequence number and stitched to the previously integrated video, if one exits to form the latest version of the integrated video. The process of stitching the different video portions together may involve the use of one or more ML models. The ML models may determine how to integrate the separate video portions together to generate a seamless integrated video.

After the integrated video has been created, method 400 proceeds to enable display of the integrated video as well as the latest video content portions, at 430. This may be achieved by transmitting the latest integrated video portion (or transmitting a link to the latest integrated video portion) to each active collaborator. Furthermore, once the video content portion has been sequence numbered and sent to each active collaborator, the application may present a UI element associated with the video content portion on each collaborator's UI screen and may enable the collaborators to separately access, replay and/or delete each video content portion.

In this manner, a mechanism may be provided for real time video collaboration production in which different users can work on creating the same video simultaneously, can view the changes made and video portions created by other users and can provide instantaneous feedback and/or editing when needed. The resulting integrated video is generated automatically from various video portions created by different collaborators and as such may include contributions from multiple people. The process is easy to use, provides high quality videos and automatically integrates various video portions together, thus saving user time and computer resources.

Figure 5:
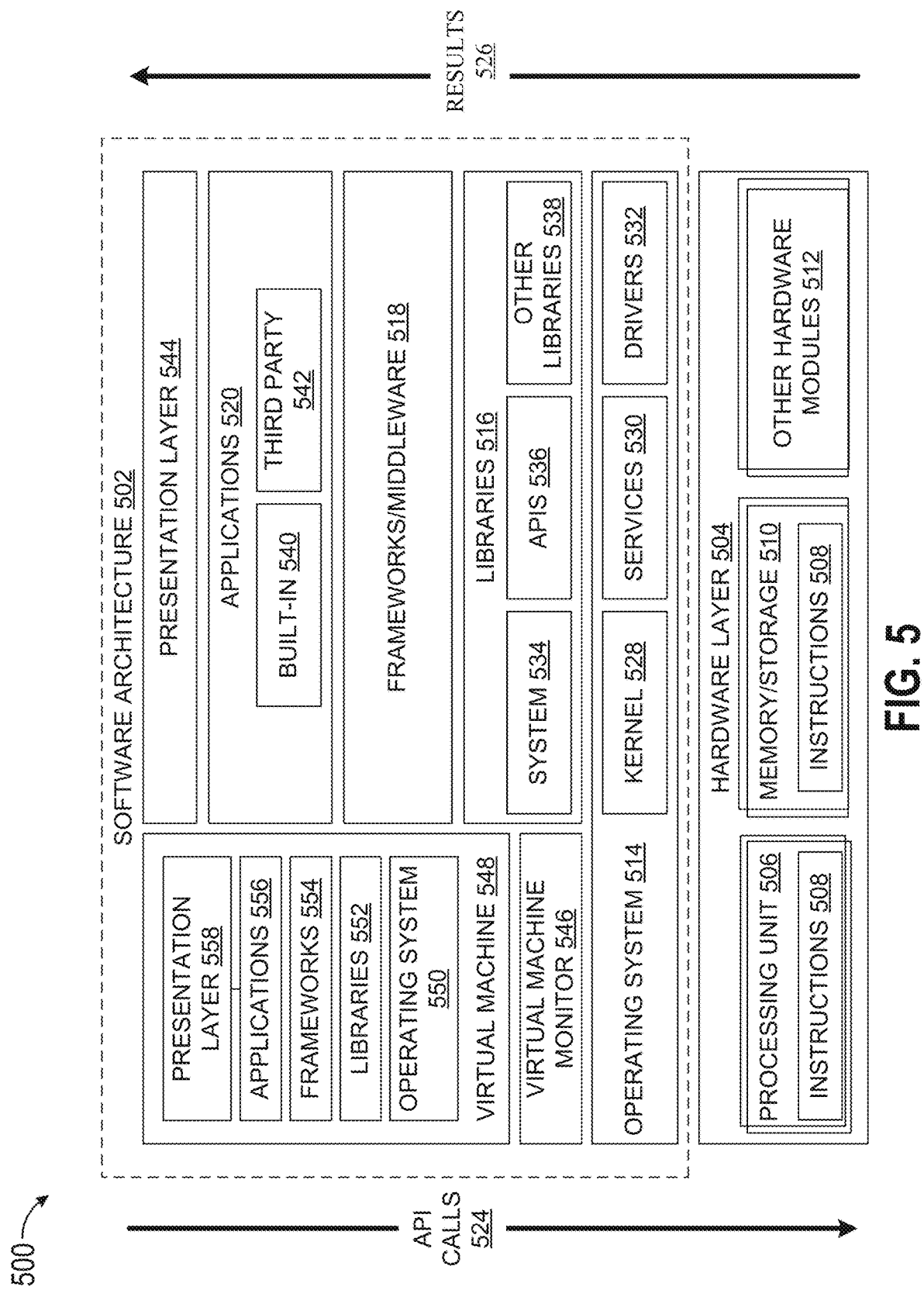
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
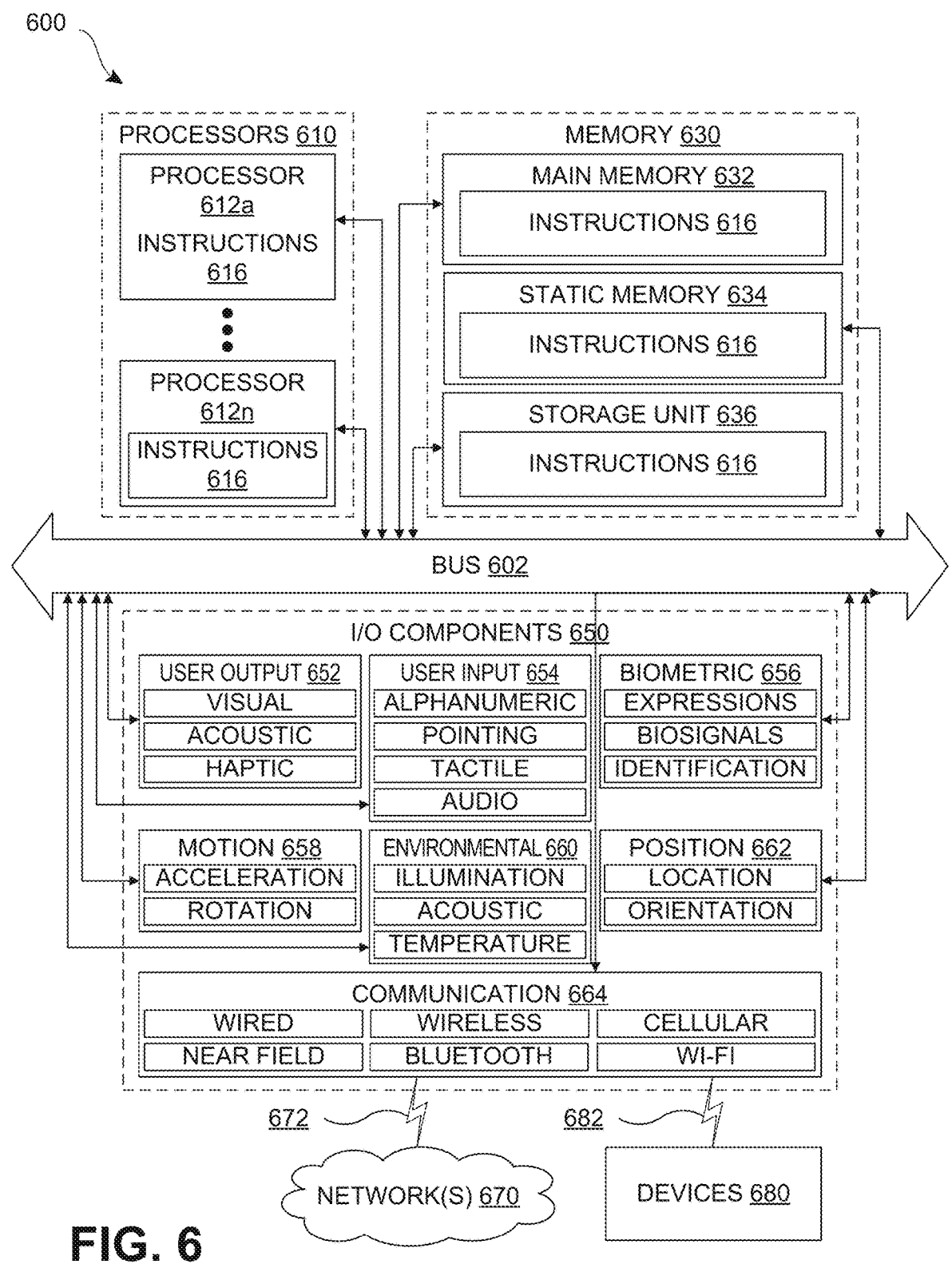
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by, the processor, cause the data processing system to perform functions of:
receiving a first video content portion from a first collaborator, the first video content portion being associated with a first sequence indicator;
receiving a second video content portion from a second collaborator, the second video content portion being associated with a second sequence indicator;
determining an order for the first video content portion and the second video content portion based on the first sequence indicator and the second sequence indicator;
automatically integrating the first video content portion with the second video content portion based on the order to create an integrated video content portion; and
providing the integrated video content portion for real-time display to the first collaborator and the second collaborator.

Item 2. The data processing system of item 1, wherein to automatically integrate the first video content portion with the second video content portion the memory further stores executable instructions that, when executed by, the processor, cause the data processing system to perform a function of stitching the first video content portion to the second video content portion in a manner that produces a smooth integrated video.

Item 3. The data processing system of item 2, wherein producing a smooth integrated video includes at least one of changing a lighting of a segment of the first video content portion or the second video content portion, adding a transition between the first video content portion and the second video content portion, overlaying one or more frames of the first video content portion on one or more frames of the second video content portion, underlaying one or more frames of the first video content portion on one or more frames of the second video content portion, removing audio noise, performing audio level matching, or inserting an audio transition.

Item 4. The data processing system of any preceding item, wherein the memory further stores executable instructions that, when executed by, the processor, cause the data processing system to perform functions of:
receiving an indication to begin video collaboration;
upon receiving the indication, enabling display of a video collaboration user interface screen on a first collaborator's screen and a second collaborator's screen; and
providing the first video content portion and the second video content portion for display on the first collaborator's screen and the second collaborator's screen.

Item 5. The data processing system of item 4, wherein the video collaboration user interface screen includes a preview pane that displays a UI element for each of the first video content portion and the second video content portion, the UI elements for the first video content portion and the second video content portion being displayed according to the order.

Item 6. The data processing system of any preceding item, wherein the instructions further cause the processor to cause the data processing system to perform functions of:
  after providing the integrated video content portion for real-time display, receiving a third video content portion from a third collaborator, the third video content portion being associated with a third sequence indicator and at least a portion of the third video content portion having been recorded while the first video content portion was being automatically integrated with the second video content portion to create the integrated video content portion;
  upon receiving the third video content portion, automatically integrating the third video content portion with the integrated video content portion to create an updated integrated video content portion; and
  providing the updated integrated video content portion for real-time display to at least one of the first, second and third collaborator.

Item 7. The data processing system of any preceding item, wherein the instructions further cause the processor to cause the data processing system to perform functions of:
  receiving a request to change the order of the first video content portion and the second video content portion;
  upon receiving the request, automatically integrating the first video content portion with the second video content portion based on the changed order to create a revised integrated video content portion; and
  providing the revised integrated video content portion for real-time display to the first collaborator and the second collaborator.

Item 8. A method for providing real time video collaboration production, comprising:
  receiving a first video content portion from a first collaborator, the first video content portion being associated with a first sequence indicator;
  receiving a second video content portion from a second collaborator, the second video content portion being associated with a second sequence indicator;
  determining an order for the first video content portion and the second video content portion based on the first sequence indicator and the second sequence indicator;
  automatically integrating the first video content portion with the second video content portion based on the order to create an integrated video content portion; and
  providing the integrated video content portion for real-time display to the first collaborator and the second collaborator.

Item 9. The method of item 8, wherein automatically integrating the first video content portion with the second video content portion includes stitching the first video content portion to the second video content portion in a manner that produces a smooth integrated video.

Item 10. The method of item 9, wherein producing a smooth integrated video includes at least one of changing a lighting of a segment of the first video content portion or the second video content portion, adding a transition between the first video content portion and the second video content portion, overlaying one or more frames of the first video content portion on one or more frames of the second video content portion, underlaying one or more frames of the first video content portion on one or more frames of the second video content portion, removing audio noise, performing audio level matching, or inserting an audio transition.

Item 11. The method of any of items 8-10, further comprising:
  receiving an indication to begin video collaboration;
  upon receiving the indication, enabling display of a video collaboration user interface screen on a first collaborator's screen and a second collaborator's screen; and
  providing the first video content portion and the second video content portion for display on the first collaborator's screen and the second collaborator's screen.

Item 12. The method of item 11, wherein the video collaboration user interface screen includes a preview pane that displays a UI element for each of the first video content portion and the second video content portion, the UI elements for the first video content portion and the second video content portion being displayed according to the order.

Item 13. The method of any of items 8-12, further comprising
  after providing the integrated video content portion for real-time display, receiving a third video content portion from a third collaborator, the third video content portion being associated with a third sequence indicator and at least a portion of the third video content portion having been recorded while the first video content portion was being automatically integrated with the second video content portion to create the integrated video content portion;
  upon receiving the third video content portion, automatically integrating the third video content portion with the integrated video content portion to create an updated integrated video content portion; and
  providing the updated integrated video content portion for real-time display to at least one of the first, second and third collaborator.

Item 14. The method of any of items 8-13, further comprising:
  receiving a request to change the order of the first video content portion and the second video content portion;
  upon receiving the request, automatically integrating the first video content portion with the second video content portion based on the changed order to create a revised integrated video content portion; and
  providing the revised integrated video content portion for real-time display to the first collaborator and the second collaborator.

Item 15. A non-transitory computer readable medium on which are stored instructions that, when executed, cause a programmable device to:
  receive a first video content portion from a first collaborator, the first video content portion being associated with a first sequence indicator;
  receive a second video content portion from a second collaborator, the second video content portion being associated with a second sequence indicator;
  determine an order for the first video content portion and the second video content portion based on the first sequence indicator and the second sequence indicator;
  automatically integrate the first video content portion with the second video content based on the order to create an integrated video content portion; and
  provide the integrated video content portion for real-time display to the first collaborator and the second collaborator.

Item 16. The non-transitory computer readable medium of item 15, wherein automatically integrating the first video content portion with the second video content includes stitching the first video content portion to the second video content portion in a manner that produces a smooth integrated video.

Item 17. The non-transitory computer readable medium of item 16, wherein producing a smooth integrated video includes at least one of changing a lighting of a segment of the first video content or the second video content, adding a transition between the first video content portion and the second video content portion, overlaying one or more frames of the first video content on one or more frames of the second video content, underlaying one or more frames of the first video content on one or more frames of the second video content, removing audio noise, performing audio level matching, or inserting an audio transition.

Item 18. The non-transitory computer readable medium of any of items 15-17, wherein the instructions, when executed, further cause the programmable device to:
  receive an indication to begin video collaboration;
  upon receiving the indication, enable display of a video collaboration user interface screen on a first collaborator's screen and a second collaborator's screen; and
  provide the first video content portion and the second video content portion for display on the first collaborator's screen and the second collaborator's screen.

Item 19. The non-transitory computer readable medium of item 18, wherein the video collaboration user interface screen includes a preview pane that displays a UI element for each of the first video content portion and the second video content portion, the UI elements for the first video content portion and the second video content portion being displayed according to the order.

Item 20. The non-transitory computer readable medium of any of items 15-19, wherein the instructions, when executed, further cause the programmable device to:
  receive a request to change the order of the first video content portion and the second video content portion;
  upon receiving the request, automatically integrate the first video content portion with the second video content based on the changed order to create a revised integrated video content portion; and
  provide the revised integrated video content portion for real-time display to the first collaborator and the second collaborator.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
  a processor; and
  a memory in communication with the processor, the memory comprising executable instructions that, when executed by the processor, cause the data processing system to perform functions of:
    receiving a first video content portion from a first collaborator, the first video content portion being associated with a first sequence indicator and a first reference sequence number;
    receiving a second video content portion from a second collaborator, the second video content portion being associated with a second sequence indicator and a second reference sequence number;
    determining an order for the first video content portion and the second video content portion based on the first sequence indicator, the first reference sequence number, the second sequence indicator, and the second reference sequence number;
    automatically integrating the first video content portion with the second video content portion based on the order to create an integrated video content portion; and providing the integrated video content portion for real-time display to the first collaborator and the second collaborator, wherein the first reference sequence number indicates a first state of video collaboration at a time the first video content portion was created and the second reference sequence number indicates a second state of video collaboration at a time the second video content portion was created.

2. The data processing system of claim 1, wherein to automatically integrate the first video content portion with the second video content portion the memory further stores executable instructions that, when executed by the processor, cause the data processing system to perform a function of stitching the first video content portion to the second video content portion in a manner that produces a smooth integrated video.

3. The data processing system of claim 2, wherein producing a smooth integrated video includes at least one of changing a lighting of a segment of the first video content portion or the second video content portion, adding a transition between the first video content portion and the second video content portion, overlaying one or more frames of the first video content portion on one or more frames of the second video content portion, underlaying one or more frames of the first video content portion on one or more frames of the second video content portion, removing audio noise, performing audio level matching, or inserting an audio transition.

4. The data processing system of claim 1, wherein the memory further stores executable instructions that, when executed by the processor, cause the data processing system to perform functions of:
 receiving an indication to begin video collaboration;
 upon receiving the indication, enabling display of a video collaboration user interface screen on a first collaborator's screen and a second collaborator's screen; and
 providing the first video content portion and the second video content portion for display on the first collaborator's screen and the second collaborator's screen.

5. The data processing system of claim 4, wherein the video collaboration user interface screen includes a preview pane that displays a UI element for each of the first video content portion and the second video content portion, the UI elements for the first video content portion and the second video content portion being displayed according to the order.

6. The data processing system of claim 1, wherein the instructions further cause the data processing system to perform functions of:
 after providing the integrated video content portion for real-time display, receiving a third video content portion from a third collaborator, the third video content portion being associated with a third sequence indicator and at least a portion of the third video content portion having been recorded while the first video content portion was being automatically integrated with the second video content portion to create the integrated video content portion;
 upon receiving the third video content portion, automatically integrating the third video content portion with the integrated video content portion to create an updated integrated video content portion; and
 providing the updated integrated video content portion for real-time display to at least one of the first, second and third collaborator.

7. The data processing system of claim 1, wherein the instructions further cause the data processing system to perform functions of:
 receiving a request to change the order of the first video content portion and the second video content portion;
 upon receiving the request, automatically integrating the first video content portion with the second video content portion based on the changed order to create a revised integrated video content portion; and
 providing the revised integrated video content portion for real-time display to the first collaborator and the second collaborator.

8. A method for providing real time video collaboration production, comprising:
 receiving a first video content portion from a first collaborator, the first video content portion being associated with a first sequence indicator and a first reference sequence number;
 receiving a second video content portion from a second collaborator, the second video content portion being associated with a second sequence indicator and a second reference sequence number;
 determining an order for the first video content portion and the second video content portion based on the first sequence indicator, the first reference sequence number, the second sequence indicator, and the second reference sequence number;
 automatically integrating the first video content portion with the second video content portion based on the order to create an integrated video content portion; and
 providing the integrated video content portion for real-time display to the first collaborator and the second collaborator,
 wherein the first reference sequence number indicates a first state of video collaboration at a time the first video content portion was created and the second reference sequence number indicates a second state of video collaboration at a time the second video content portion was created.

9. The method of claim 8, wherein automatically integrating the first video content portion with the second video content portion includes stitching the first video content portion to the second video content portion in a manner that produces a smooth integrated video.

10. The method of claim 9, wherein producing a smooth integrated video includes at least one of changing a lighting of a segment of the first video content portion or the second video content portion, adding a transition between the first video content portion and the second video content portion, overlaying one or more frames of the first video content portion on one or more frames of the second video content portion, underlaying one or more frames of the first video content portion on one or more frames of the second video content portion, removing audio noise, performing audio level matching, or inserting an audio transition.

11. The method of claim 8, further comprising:
 receiving an indication to begin video collaboration;
 upon receiving the indication, enabling display of a video collaboration user interface screen on a first collaborator's screen and a second collaborator's screen; and
 providing the first video content portion and the second video content portion for display on the first collaborator's screen and the second collaborator's screen.

12. The method of claim 11, wherein the video collaboration user interface screen includes a preview pane that displays a UI element for each of the first video content portion and the second video content portion, the UI elements for the first video content portion and the second video content portion being displayed according to the order.

13. The method of claim 8, further comprising
after providing the integrated video content portion for real-time display, receiving a third video content portion from a third collaborator, the third video content portion being associated with a third sequence indicator and at least a portion of the third video content portion having been recorded while the first video content portion was being automatically integrated with the second video content portion to create the integrated video content portion;
upon receiving the third video content portion, automatically integrating the third video content portion with the integrated video content portion to create an updated integrated video content portion; and
providing the updated integrated video content portion for real-time display to at least one of the first, second and third collaborator.

14. The method of claim 8, further comprising:
receiving a request to change the order of the first video content portion and the second video content portion;
upon receiving the request, automatically integrating the first video content portion with the second video content portion based on the changed order to create a revised integrated video content portion; and
providing the revised integrated video content portion for real-time display to the first collaborator and the second collaborator.

15. A non-transitory computer readable medium on which are stored instructions that, when executed, cause a programmable device to:
receive a first video content portion from a first collaborator, the first video content portion being associated with a first sequence indicator and a first reference sequence number;
receive a second video content portion from a second collaborator, the second video content portion being associated with a second sequence indicator and a second reference sequence number;
determine an order for the first video content portion and the second video content portion based on the first sequence indicator, the first reference sequence number, the second sequence indicator, and the second reference sequence number;
automatically integrate the first video content portion with the second video content portion based on the order to create an integrated video content portion; and
provide the integrated video content portion for real-time display to the first collaborator and the second collaborator,
wherein the first reference sequence number indicates a first state of video collaboration at a time the first video content portion was created and the second reference sequence number indicates a second state of video collaboration at a time the second video content portion was created.

16. The non-transitory computer readable medium of claim 15, wherein automatically integrating the first video content portion with the second video content includes stitching the first video content portion to the second video content portion in a manner that produces a smooth integrated video.

17. The non-transitory computer readable medium of claim 16, wherein producing a smooth integrated video includes at least one of changing a lighting of a segment of the first video content or the second video content, adding a transition between the first video content portion and the second video content portion, overlaying one or more frames of the first video content on one or more frames of the second video content, underlaying one or more frames of the first video content on one or more frames of the second video content, removing audio noise, performing audio level matching, or inserting an audio transition.

18. The non-transitory computer readable medium of claim 15, wherein the instructions, when executed, further cause the programmable device to:
receive an indication to begin video collaboration;
upon receiving the indication, enable display of a video collaboration user interface screen on a first collaborator's screen and a second collaborator's screen; and
provide the first video content portion and the second video content portion for display on the first collaborator's screen and the second collaborator's screen.

19. The non-transitory computer readable medium of claim 18, wherein the video collaboration user interface screen includes a preview pane that displays a UI element for each of the first video content portion and the second video content portion, the UI elements for the first video content portion and the second video content portion being displayed according to the order.

20. The non-transitory computer readable medium of claim 15, wherein the instructions, when executed, further cause the programmable device to:
receive a request to change the order of the first video content portion and the second video content portion;
upon receiving the request, automatically integrate the first video content portion with the second video content based on the changed order to create a revised integrated video content portion; and
provide the revised integrated video content portion for real-time display to the first collaborator and the second collaborator.

* * * * *